United States Patent
Kerr

(10) Patent No.: US 7,319,637 B2
(45) Date of Patent: Jan. 15, 2008

(54) SYSTEM AND METHODS FOR ENHANCING AN IMAGE OF POST-STACK SEISMIC DATA WITH PRE-STACK SEISMIC DATA FEATURES

(75) Inventor: John Kerr, Sutton (GB)

(73) Assignee: Landmark Graphics Corporation, Houston, TX (US)

( * ) Notice: Subject to any disclaimer, the term of this patent is extended or adjusted under 35 U.S.C. 154(b) by 49 days.

(21) Appl. No.: 11/231,262

(22) Filed: Sep. 20, 2005

(65) Prior Publication Data

US 2007/0064533 A1    Mar. 22, 2007

(51) Int. Cl.
*G01V 1/00* (2006.01)
(52) U.S. Cl. ........................................ 367/38
(58) Field of Classification Search ................. 367/38, 367/68
See application file for complete search history.

(56) References Cited

U.S. PATENT DOCUMENTS 6,049,759 A * 4/2000 Etgen ........................ 702/14
6,236,943 B1 * 5/2001 Aminzadeh et al. .......... 702/16
6,754,591 B1 * 6/2004 Herkenhoff et al. .......... 702/14
2004/0098200 A1 * 5/2004 Wentland et al. .............. 702/2
2005/0288863 A1 * 12/2005 Workman .................... 702/14

OTHER PUBLICATIONS

Paul J. Hatchell, Fault Whispers: Transmission distortions on prestack seismic reflection data, GEOPHYSICS, vol. 65, No. 2 (Mar.-Apr. 2000); pp. 377-389, 19 FIGS.
Paul Gutowski, Scope3d—compute 3D volume of attributes under horizon control for prestack or poststack data [online], [retrieved Dec. 20, 2005]. Retrieved from the internet : <URL: http://www.freeusp.org/RaceCarWebsite/TheToolkit/Man_alphabetic/scope3d.html>; copyright 2001, Amoco Production Company.

* cited by examiner

*Primary Examiner*—Deandra M Hughes
(74) *Attorney, Agent, or Firm*—Crain, Caton & James

(57) ABSTRACT

A system and methods for enhancing an image of post-stack seismic data, with pre-stack seismic data features, and displaying the enhanced image with the image of the post-stack seismic data are disclosed.

14 Claims, 5 Drawing Sheets

SYSTEM AND METHODS FOR ENHANCING AN IMAGE OF POST-STACK SEISMIC DATA WITH PRE-STACK SEISMIC DATA FEATURES

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention generally relates to a system and methods for enhancing an image of post-stack seismic data with pre-stack seismic data features and displaying the enhanced image with the image of the post-stack seismic data.

BACKGROUND OF THE INVENTION

The use of seismic data to analyze subsurface geological structures, such as faults or other stratographic features, is relevant to interpreters searching for subsurface mineral and hydrocarbon deposits.

The acquisition of seismic data is typically accomplished by transmitting an acoustic signal into the earth and recording reflections of the signal. The layers of rock within the earth differ in their acoustic properties and these changes in properties produce reflections of the seismic signal. Data acquisition therefore, involves energy sources generating signals propagating into the earth and reflecting from subsurface geological structures. The reflected signals are recorded by receivers on or near the surface of the earth. The reflected signals are stored as time series (pre-stack seismic traces) that consist of amplitudes of acoustic energy, which vary as a function of time, receiver position and source position. Because subsurface geological structures are different, depending on formation layers within the earth, the variation in the amplitudes of the reflected acoustic signals are indicative of the physical properties of these structures from which the signals reflect.

The seismic data are generally processed to create acoustic images from which data interpreters may create images of the subsurface formations. Data processing therefore, involves procedures that vary depending on the nature of the seismic data acquired and the geological structure being interpreted. A single echo (reflection) train is usually called a seismic trace. A seismic trace generally represents a combination of many sinusoidal waves as a function of time. The strength of the recorded reflections rises and falls over a period of several seconds, and is recorded in digital form or converted to digital form for processing and analysis. The variations in the seismic trace generally consist of amplitude characteristics such as peaks, zero crossings and troughs.

A collection of seismic traces (known as pre-stack gathers) may be stacked (processed) to form an image referred to as post-stack seismic data. Both pre-stack and post-stack seismic data images may be interpreted in a variety of different ways to ascertain the nature of the sub-surface geological structures being investigated for mineral and hydrocarbon deposits. However, the differences in data format and display between pre-stack and post-stack seismic data images force these interpretations, and any further related processing, to be largely independent of one another.

An example of this limited linking between pre-stack and post-stack seismic data is provided by Paul Hatchell in his paper "Fault whispers: Transmission distortions on pre-stack seismic reflection data," which is incorporated herein by reference and illustrated in FIG. 8. A series of normal move out (NMO)-corrected migrated common mid-point (CMP) gathers from one in-line location are illustrated on the left side of FIG. 8. For each NMO-corrected migrated CMP gather at a respective cross-line location, a corresponding feature plot is derived (maximum trough amplitudes for each event versus offset) and illustrated on the right side of FIG. 8. Although amplitude and time distortions that move systematically with cross-line position are evident from this type of analysis and display, this type of display does not allow the correlation of such distortion patterns with any related post-stack seismic data or further processing and analysis of the same using post stack techniques.

SUMMARY OF THE INVENTION

The present invention overcomes one or more deficiencies in the prior art by providing a system and methods for enhancing an image of post-stack seismic data, with pre-stack seismic data features, in the following manner.

In one embodiment, the present invention includes a system for enhancing an image of post-stack seismic data comprising a computer-readable memory medium configured to store a program of instructions being executable to implement: i) selecting a post-stack seismic data trace from the post-stack seismic data, the post-stack seismic data trace representing a gather of pre-stack seismic data traces; ii) displaying the gather; iii) selecting a feature revealed by the gather; iv) plotting the feature; v) selecting another post-stack seismic data trace from the post-stack seismic data, the another post-stack seismic data trace representing another gather of pre-stack seismic data traces; vi) displaying the another gather; vii) selecting another feature revealed by the another gather; viii) plotting the another feature; and ix) grouping the plotted feature and the another plotted feature to form an enhanced image of the post-stack seismic data.

In another embodiment, the present invention includes a method for enhancing an image of post-stack seismic data comprising the steps of: i) selecting a post-stack seismic data trace representing a gather of pre-stack seismic data traces; ii) displaying the gather; iii) selecting a feature revealed by the gather; iv) plotting the feature; v) selecting another post-stack seismic data trace from the post-stack seismic data, the another post-stack seismic data trace representing another gather of pre-stack seismic data traces; vi) displaying the another gather; vii) selecting another feature revealed by the another gather; viii) plotting the another feature; and ix) grouping the plotted feature and the another plotted feature to form an enhanced image of the post-stack seismic data.

These and other objects, features and advantages of the present invention will become apparent to those skilled in the art from the following description of the various embodiments and related drawings.

BRIEF DESCRIPTION OF THE DRAWINGS

The present invention is described below with reference to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The claimed subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

The present invention provides an improved system and methods for enhancing an image of post-stack seismic data. The invention may be described in the general context of a computer-executable program of instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
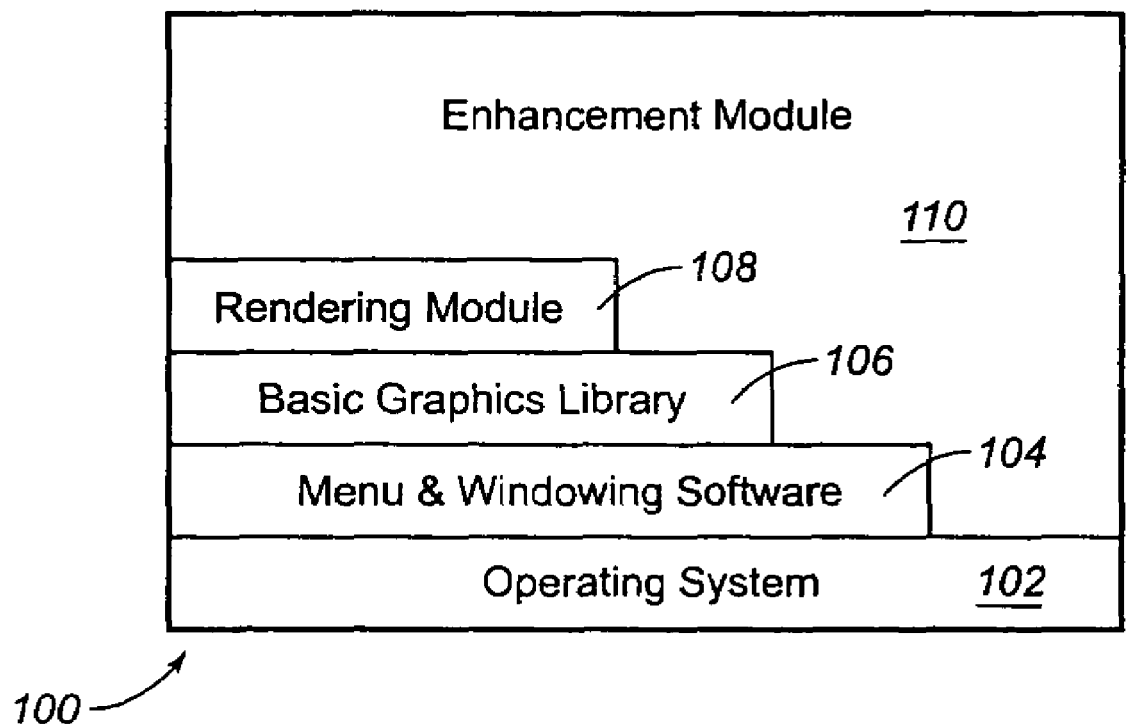
FIG. 1 is a block diagram illustrating one embodiment of a program for implementing the present invention.

The present invention may therefore, be implemented using hardware, software or a combination thereof, in a computer system or other processing system. FIG. 1 is a block diagram illustrating one embodiment of a software program 100 for implementing the present invention. At the base of program 100 is an operating system 102. A suitable operating system 102 may include, for example, a Windows® operating system from Microsoft Corporation, or other operating systems as would be apparent to one of skill in the relevant art.

Menu and windowing software 104 overlays operating system 102. The menu and windowing software 104 are used to provide various menus and windows to facilitate interaction with the user, and to obtain user input and instructions. As would be readily apparent to one of skill in the relevant art, any number of menu and windowing software programs could be used in conjunction with the present invention.

A basic graphics library 106 overlays the menu and windowing software 104. The basic graphics library 106 is an application programming interface (API) for computer graphics. The functions performed by the basic graphics library 106 may include, for example, geometric and raster primitives, RGBA or color index mode, display list or immediate mode, viewing and modeling transformations, lighting and shading, hidden surface removal, alpha blending (translucency), anti-aliasing, texture mapping, feedback and selection, stencil planes, and accumulation buffer.

A rendering module 108 overlays basic graphics library 106. As will be understood by those skilled in the art, the rendering module 108 may include a suite of tools for 2D/3D seismic data interpretations, including interactive horizon and fault management, 3D visualization, and attribute analysis. For example, Landmark Graphics Corporation's SeisWorks application is a seismic rendering application appropriate for use with the present invention.

Overlaying the other elements of program 100 is an enhancement module 110. The enhancement module 110 is configured to interact with the post-stack seismic data based on the methods described herein. In a manner generally well known in the art, the enhancement module 110 interfaces with, and utilizes the functions carried out by, the rendering module 108, the basic graphics library 106, the menu and windowing software 104, and the operating system 102. The enhancement module 110 may be written in an object oriented programming language such as, for example, C++ to allow the creation and use of objects and object functionality.

The program 100 illustrated in FIG. 1 may be executed or implemented through the use of a computer system incorporating the program 100 and various hardware components. The hardware components may include, for example, a processor, memory (e.g., random access memory and/or non-volatile memory devices), one or more input devices, one or more display devices, and one or more interface devices. These hardware components may be interconnected according to a variety of configurations. Non-volatile memory devices may include, for example, devices such as tape drives, disk drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to acquire the post-stack seismic data from one or more remote computers or storage devices through a network.

A processor may be configured to reprogram instructions and/or data from RAM and/or non-volatile memory devices, and to store computational results into RAM and/or non-volatile memory devices. The program instructions direct the processor to operate on the post-stack seismic data based on the methods described herein. The post-stack seismic data may be provided to the computer system through a variety of mechanisms. For example, the post-stack seismic data may be acquired into non-volatile memory and/or RAM using one or more interface devices. As another example, the post-stack seismic data may be supplied to the computer system by a memory medium (storage device) such as a disk or a tape, which is loaded into/onto one of the non-volatile memory devices. In this case, the post-stack seismic data will have been previously recorded onto the memory medium.

It is noted that the post-stack seismic data may not necessarily be raw sensor data obtained by an acquisition device. For example, the post-stack seismic data may be the result of one or more processing operations using a set of raw sensor data. The processing operation(s) may be performed by the computer system and/or one or more other computers.

The methods of the present invention may be realized in one or more software programs or modules, which are stored onto any of a variety of memory media such as CD-ROM, magnetic disk, bubble memory, semiconductor memory (e.g., any of a various types of RAM or ROM). Furthermore, the software program(s) and/or their results may be transmitted over a variety of carrier media such as optical fiber, metallic wire, free space and/or through any of a variety of networks such as the internet.

Figure 2:
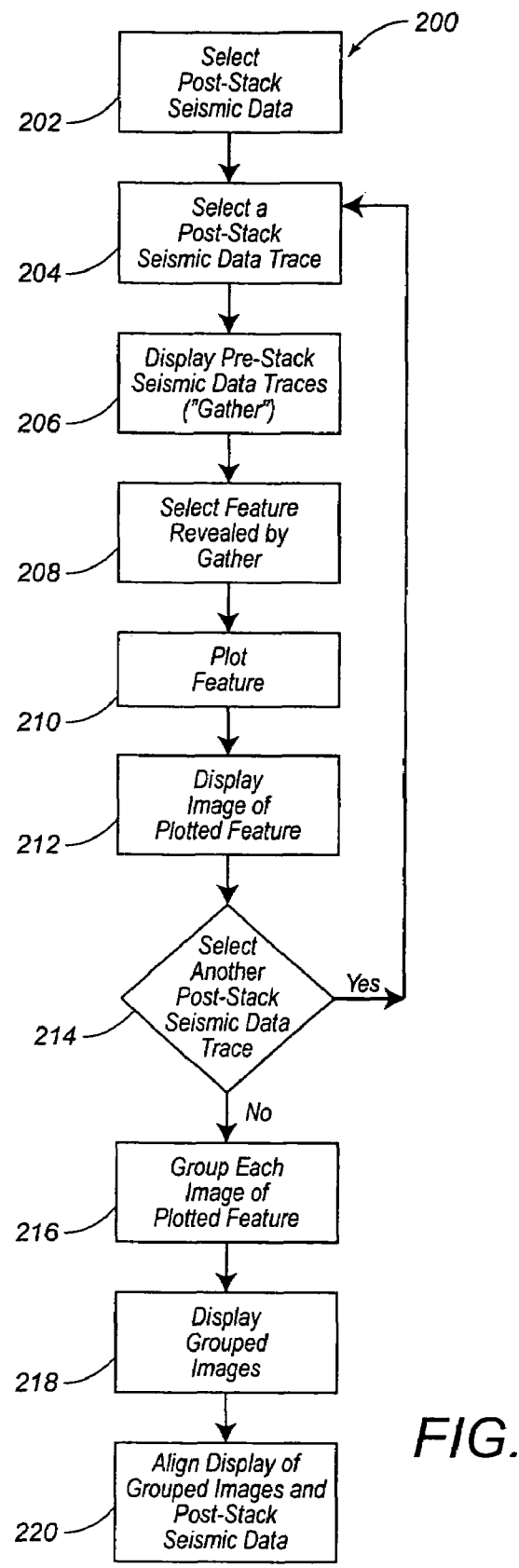
FIG. 2 is a flow diagram illustrating one embodiment of a method for implementing the present invention.

Referring now to FIG. 2, a method 200 for enhancing an image of post-stack seismic data is illustrated in a flow diagram.

Figure 3:
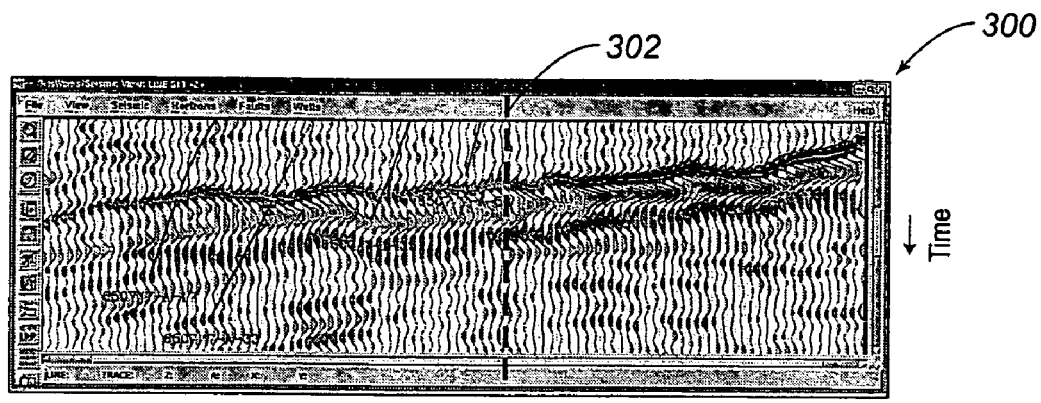
FIG. 3 illustrates step 202 in FIG. 2.

In step 202, post-stack seismic data is selected from a source such as one or more remote computers or storage devices through a network. As mentioned above, the post-stack seismic data may be remotely supplied through a network interface device from another computer or storage device or it may be directly supplied by a storage device such as a disk or a tape. The post-stack seismic data selected in step 202 is illustrated in FIG. 3 and represents seismic data traces from different shot records with a common reflection point (CMP). In FIG. 3, "raw" post-stack seismic data amplitudes are illustrated over a time window around a key seismic event. This raw post-stack seismic data, or any other post-stack seismic data attribute derived from processed raw post-stack seismic data, may be used for selecting pre-stack seismic data in the manner described below.

In step 204, a post-stack seismic data trace, representing a gather of pre-stack seismic data traces, is selected from the post-stack seismic data illustrated in FIG. 3 using an input device such as a mouse. The selection of the post-stack seismic data trace 302 at the location in FIG. 3 may be arbitrary or based upon an event representing an amplitude anomaly. Additionally, the post-stack seismic data trace 302 may be selected from any in-line location, cross-line location or any other location in the post-stack seismic data illustrated in FIG. 3.

Figure 4:
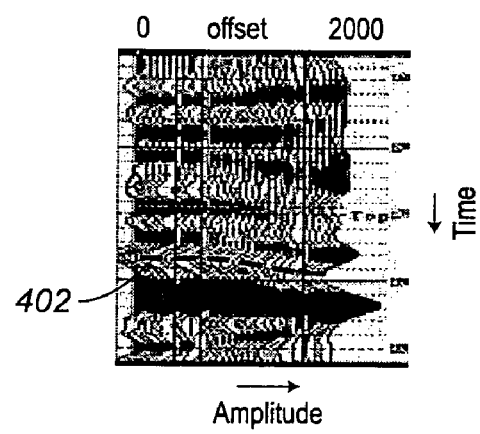
FIG. 4 illustrates step 206 in FIG. 2.

In step 206, the gather of pre-stack seismic data traces represented by the post-stack seismic data trace 302 are displayed. This step may be performed by methods or techniques well known in the art for recalling or recreating the gather of pre-stack seismic data traces used as input to create the post-stack seismic data trace 302, and displaying the same using conventional display devices. Any related gathers of pre-stack seismic data such as, for example, wide angle gathers, super gathers and time lapse gathers may be recalled and displayed in the same manner. The gather of pre-stack seismic data traces displayed in step 206 are illustrated in FIG. 4 and represent a CMP gather of pre-stack seismic data traces. Further, the gather of pre-stack seismic data traces illustrated in FIG. 4 are sorted by offset to illustrate amplitude variation with offset (AVO) as a function of time. Accordingly, the amplitude and offset increase from left to right in FIG. 4. However, depending on the pre-stack seismic data processing technique(s), the pre-stack seismic data traces may be illustrated using other parameters such as, for example, amplitude variation with angle (AVA) as a function of time. Conventional processing techniques may include, for example, seismic amplitude, frequency and phase calculation and AVO, AVA and AVOA attribute calculation.

In step 208, a feature revealed by the gather of pre-stack seismic data traces is selected using any conventional input device. The selected feature 402 is illustrated in FIG. 4 and represents a horizon of interest. The feature 402 generally illustrates an amplitude variation with offset curve for every cross-line/in-line XY location. Other features revealed by related gathers and attribute gathers of the pre-stack seismic data traces illustrated in FIG. 4 may be selected for analysis such as, for example, time lapse amplitude variation with offset, azimuth AVO and frequency variation with offset.

In step 210, the feature 402 selected in step 208 is plotted using techniques well known in the art and any conventional input device. The plotted feature represents an AVO curve.

Figure 5:
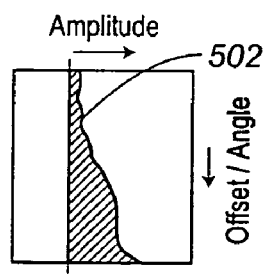
FIG. 5 illustrates step 212 in FIG. 2.

In step 212, the plotted feature is displayed using any conventional display device. As illustrated in FIG. 5, the plotted feature 502 may be plotted using amplitude increasing along the horizontal axis from left to right and offset or angle increasing along the vertical axis from top to bottom. The orientation of the plotted feature 502 in FIG. 5 has been rotated (counter-clockwise) by ninety (90) degrees and translated (flipped about the horizontal axis) compared to the feature 402 illustrated in FIG. 4. This technique may be used to orient the plotted feature 502 so that it may be aligned with the corresponding post-stack seismic data trace 302 illustrated in FIG. 3.

In step 214, another post-stack seismic data trace at another location in FIG. 3 may be selected in the manner described in reference to step 204 and the process repeated through step 212 as necessary or desired. Preferably, the process is applied to each post-stack seismic data trace illustrated in FIG. 3.

In step 216, each image of a plotted feature, as illustrated in FIG. 5, is grouped—meaning positioned at a location that corresponds with the location of a respective post-stack seismic data trace used to determine each plotted feature.

Figure 6:
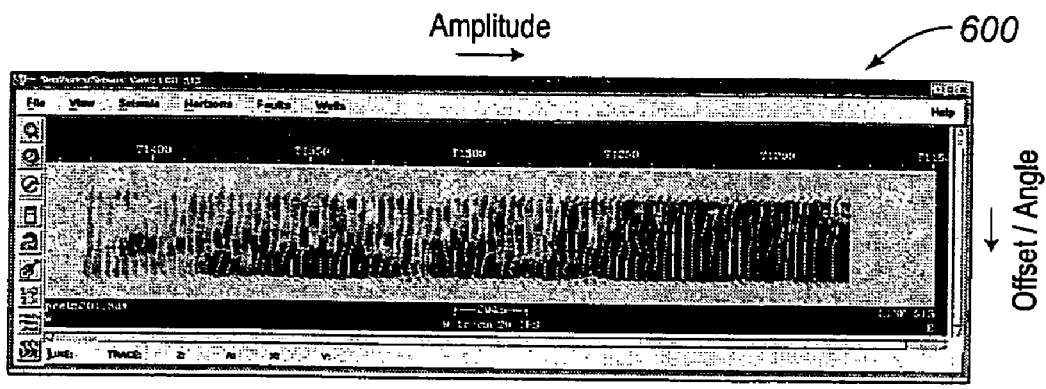
FIG. 6 illustrates step 218 in FIG. 2.

In step 218, the grouped images are displayed using any conventional display device. As illustrated in FIG. 6, the grouped images that are displayed represent an enhanced image of the post-stack seismic data illustrated in FIG. 3.

Figure 7:
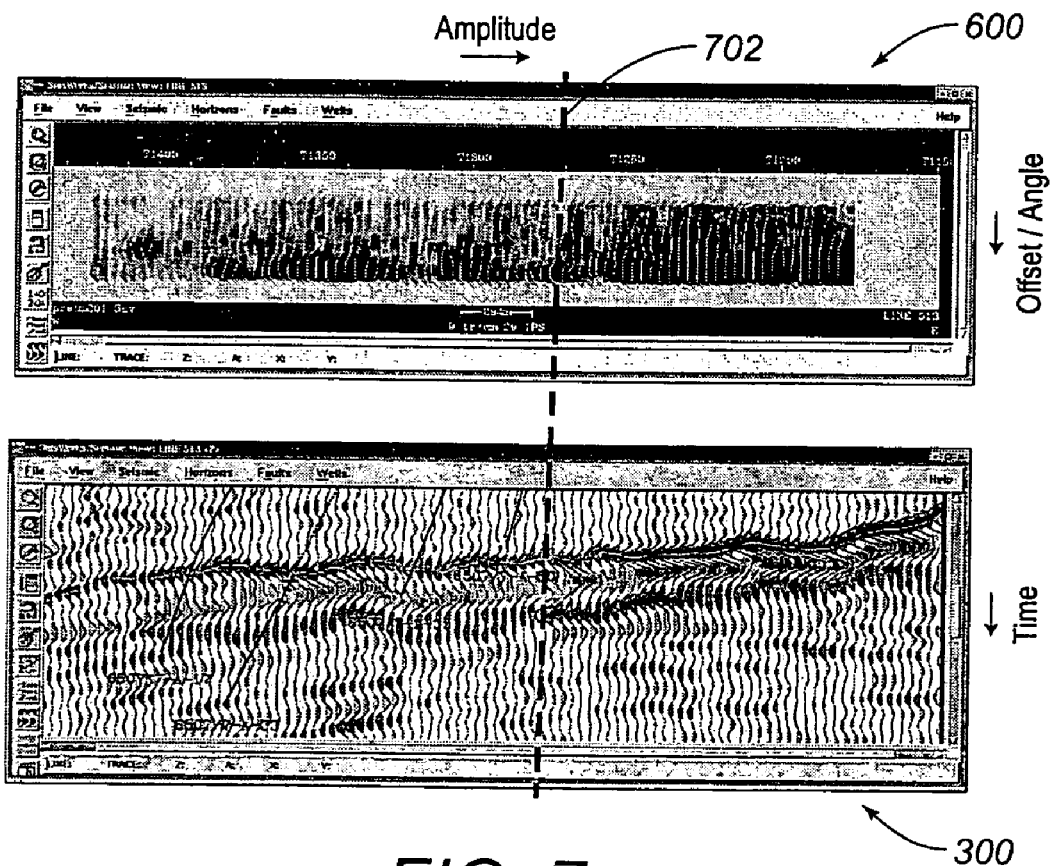
FIG. 7 illustrates step 220 in FIG. 2.
Figure 8:
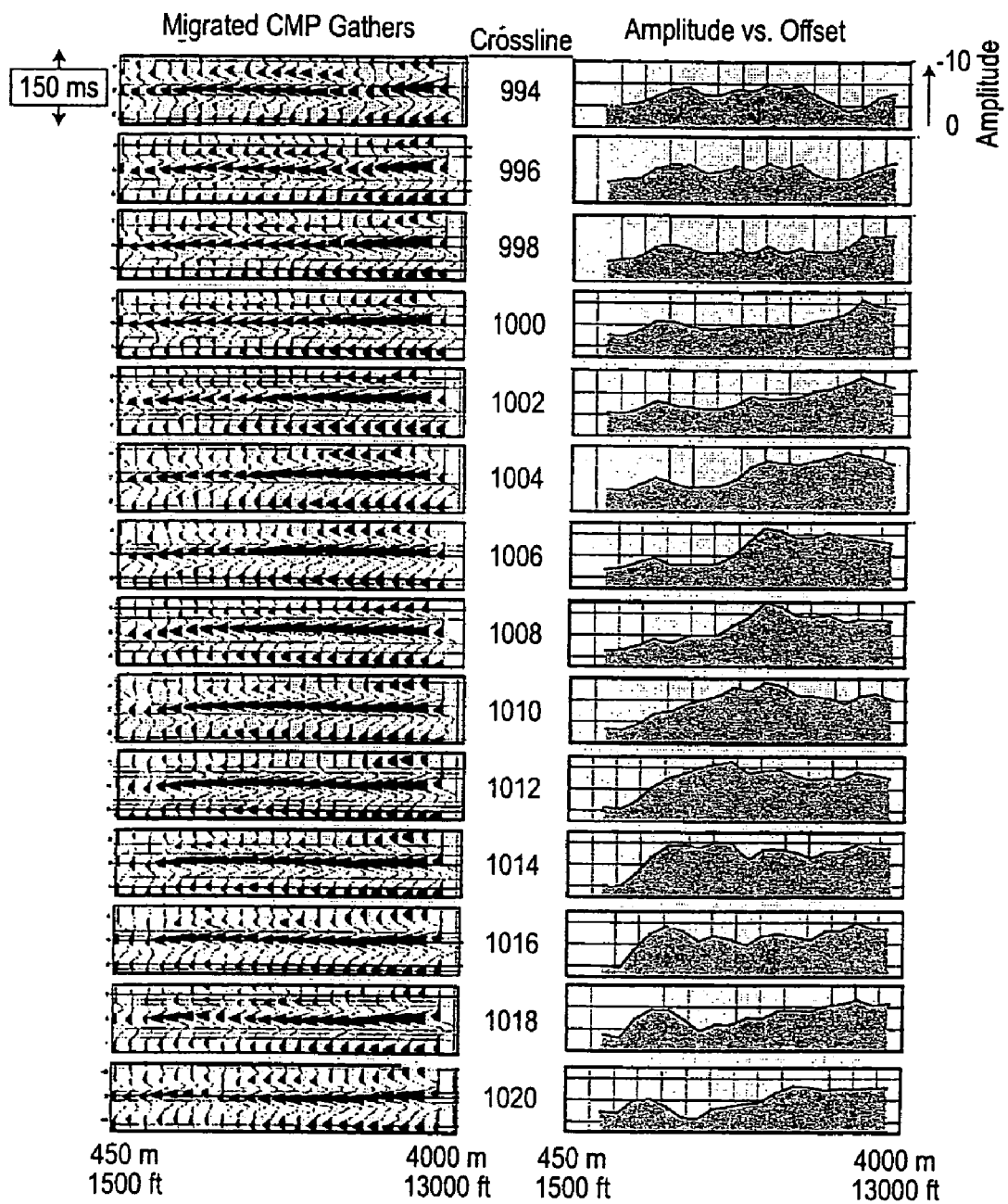
FIG. 8 illustrates NMO-corrected migrated CMP gathers (left) and snapped trough AVO's (right) at several cross-line locations along in-line 624.

In step 220, the grouped images displayed in step 218 (FIG. 6) may be aligned with the post-stack seismic data selected in step 202. As illustrated in FIG. 7, the grouped images illustrated in FIG. 6 (600) are aligned with the post-stack seismic data illustrated in FIG. 3 (300). In this manner, a direct comparison and analysis may be made between the post-stack seismic data 300 and the grouped images 600. In FIG. 7, common line 702 represents, for example, the vertical location of a single post-stack seismic data trace in the post-stack seismic data 300 and a corresponding plotted feature in the grouped images 600. The vertical alignment and orientation of each image of a plotted feature in the grouped images 600 with a corresponding post-stack seismic data trace in the post-stack seismic data 300 enables a direct comparison between the post-stack seismic data attribute at each location and an enhanced image of the post-stack seismic data attribute represented by the plotted feature.

The system and methods of the present invention therefore, improve the ability to recognize and process amplitude variation patterns, and other attribute anomalies, indicative of hydrocarbon resources that are not obvious from the post-stack seismic data alone. Various alternatives and/or modifications may be made to the disclosed embodiments without departing from the spirit or scope of the invention defined by the appended claims and equivalents thereof.

The invention claimed is:

1. A method for interpreting an image of post-stack seismic data represented by a seismic attribute, the method comprising:
   selecting a post-stack seismic data trace from the post-stack seismic data, the post-stack seismic data trace representing a gather of pre-stack seismic data traces;
   displaying the gather of pre-stack data traces;
   selecting a feature represented by the gather;
   plotting the feature;
   selecting another post-stack seismic data trace from the post-stack seismic data, the another post-stack seismic data trace representing another gather of pre-stack seismic data traces;
   displaying the another gather of pre-stack data traces;
   selecting another feature represented by the another gather;
   plotting the another feature;
   grouping the plotted feature and the plotted another feature to form an enhanced image, the enhanced image including a horizontal axis for seismic attribute values and a vertical axis for offset values or angle values; and
   displaying the enhanced image in alignment with the image of the post-stack seismic data, the plotted feature and the another plotted feature aligned respectively with the post-stack seismic data trace and the another post-stack seismic data trace.

2. The method of claim 1, wherein the feature and the another feature represent an anomaly in the post-stack seismic data.

3. The method of claim 1, wherein the seismic attribute is selected from the group comprising one of amplitude, dip, frequency, phase and polarity.

4. The method of claim 2, wherein the feature and the another feature each represent a horizon.

5. The method of claim 3, wherein the seismic attribute is amplitude and the gather and the another gather are displayed with an amplitude value and an offset value or an angle value for each pre-stack seismic data trace in the gather and the another gather, as a function of time.

6. The method of claim 5, wherein the feature and the another feature are plotted using one of the amplitude values and one of the offset values or the angle values for each pre-stack seismic data trace in the gather and the another gather, respectively.

7. The method of claim 6, wherein the amplitude values are plotted on the horizontal axis and the offset values or the angle values are plotted on the vertical axis.

8. A system for interpreting an image of post-stack seismic data represented by a seismic attribute, the system comprising a computer-readable memory medium configured to store a program of instructions, the program instructions being executable to implement:
   selecting a post-stack seismic data trace from the post-stack seismic data, the post-stack seismic data trace representing a gather of pre-stack seismic data traces;
   displaying the gather of pre-stack data traces;
   selecting a feature represented by the gather;
   plotting the feature;
   selecting another post-stack seismic data trace from the post-stack seismic data, the another post-stack seismic data trace representing another gather of pre-stack seismic data traces;
   displaying the another gather of pre-stack data traces;
   selecting another feature represented by the another gather;
   plotting the another feature;
   grouping the plotted feature and the another plotted feature to form an enhanced image, the enhanced image including a horizontal axis for seismic attribute values and a vertical axis for offset values or angle values; and
   displaying the enhanced image in alignment with the image of the post-stack seismic data, the plotted feature and the another plotted feature aligned respectively with the post-stack seismic data trace. and the another post-stack seismic data trace.

9. The system of claim 8, wherein the feature and the another feature represent an anomaly in the post-stack seismic data.

10. The system of claim 8, wherein the seismic attribute is selected from the group comprising one of amplitude, dip, frequency, phase and polarity.

11. The system of claim 9, wherein the feature and the another feature each represent a horizon.

12. The system of claim 10, wherein the seismic attribute is amplitude and the gather and the another gather are displayed with an amplitude value and an offset value or an angle value for each pre-stack seismic data trace in the gather and the another gather, as a function of time.

13. The system of claim 12, wherein the feature and the another feature are plotted using one of the amplitude values and one of the offset values or the angle values for each pre-stack seismic data trace in the gather and the another gather, respectively.

14. The system of claim 13, wherein the amplitude values are plotted on the horizontal axis and the offset values or the angle values are plotted on the vertical axis.

* * * * *